Oct. 2, 1962   C. A. BORCK ETAL   3,056,926
MICROWAVE POWER DENSITY PROBE
Filed July 15, 1959   2 Sheets-Sheet 1
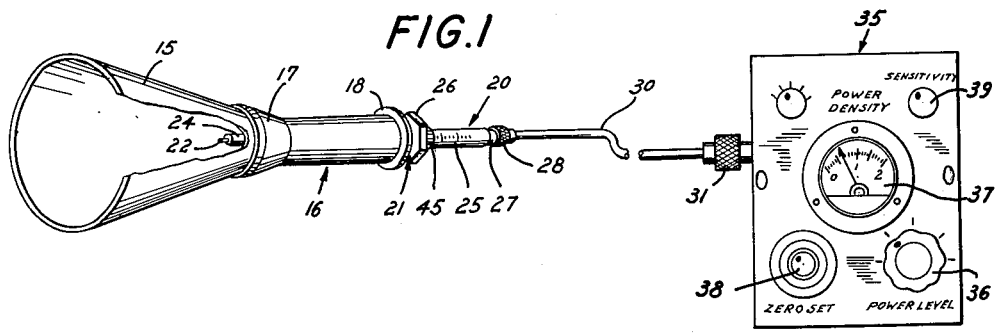
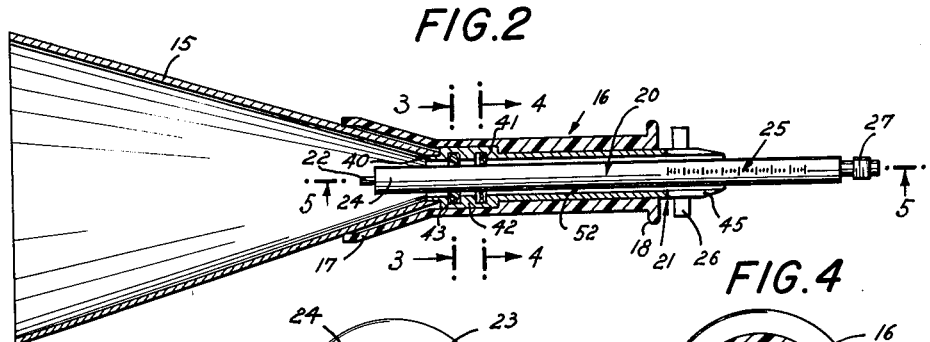
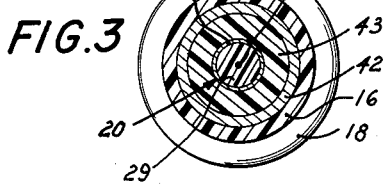
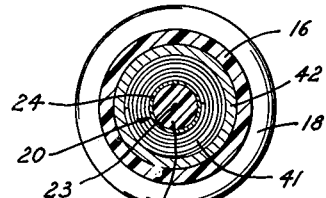
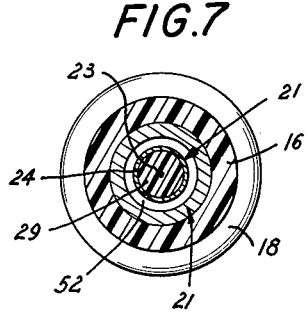
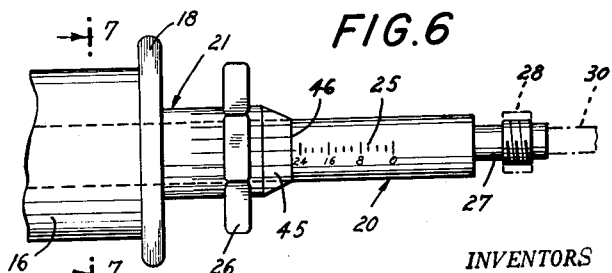
INVENTORS
CHARLES ALAN BORCK
KENNETH WM. KNAPP
BY
Richard A. Marse
ATTORNEY

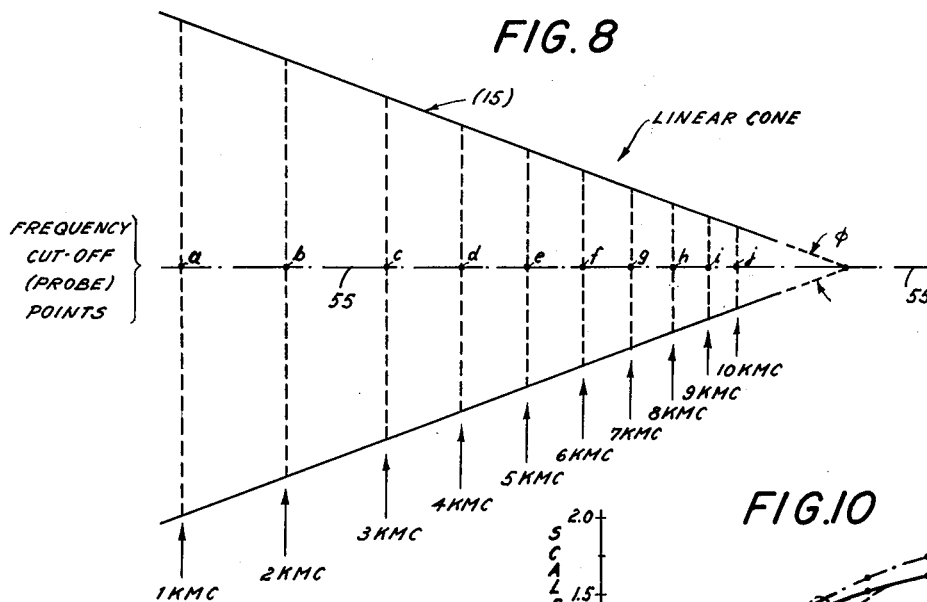
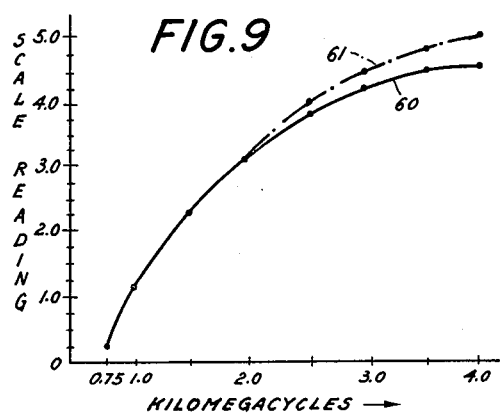
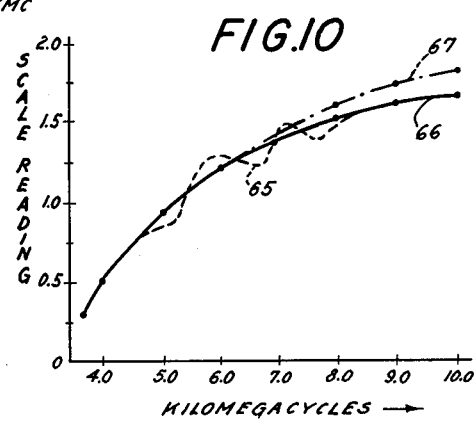
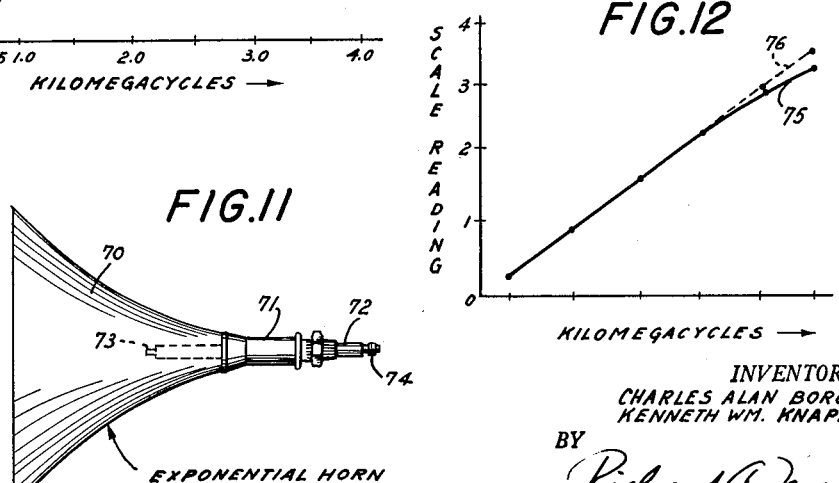
INVENTORS
CHARLES ALAN BORCK
KENNETH WM. KNAPP
BY
ATTORNEY

United States Patent Office 3,056,926
Patented Oct. 2, 1962

3,056,926
MICROWAVE POWER DENSITY PROBE
Charles Alan Borck, Schenectady, and Kenneth W. Knapp, Scotia, N.Y., assignors to Empire Devices, Inc., Amsterdam, N.Y.
Filed July 15, 1959, Ser. No. 827,359
12 Claims. (Cl. 325—67)

This invention relates to apparatus for the direct measurement of the field intensity of microwaves, and more particularly relates to the measurement of the power density of such waves above the order of 700 megacycles.

In accordance with the present invention a novel broad band microwave probe is utilized as a transducer to convert power density of the waves to a predetermined constant power into an unbalanced line. A conventional power bridge with an unbalanced line input is connected to the transducer and calibrated to read in terms of absolute power. The novel microwave probe hereof is used to convert input fields of high power density to relatively low signal power levels for the bridge meter. In this manner high density fields that are hazardous for personnel can be directly measured with a portable relatively inexpensive probe immersed in the power field.

The invention system utilizes the same type and/or size of absolute power meter as in the copending application, one that indicates power densities of the order of 1 milliwatt to 1 watt per square centimeter, and higher. The probe hereof is usable in high density fields and near field intensity measurements over its designed frequency range, namely above the order of 700 megacycles. It is usable for the detection of hot spots and leakage near antennas, antenna feeds and other high powered components. It is also useful in connection with the area about long range radar, early warning radar, etc.

It has heretofore been the practice to probe microwave fields by tunable resonant elements, and conduct resultant substantial power through attenuators and indicating equipment. However, where high powered densities are involved such methods are impractical for portable equipment. For example, it would be necessary, using conventional prior art measuring devices with dissipative attenuators, to dissipate up to 2000 watts to provide the range of measurement that the present invention affords. Such prior apparatus was bulky, heavy and costly. Also, there was always the problem of overloading and burning out the meter indicator. The probe system hereof is a low powered arrangement.

In accordance with the present invention we provide a novel tunable probe incorporating horn assembly oriented to a below cut-off pick-up mode. The invention probe has a central pick-up member that is preset for the frequency of the field measurements. The horns hereof are constructed to convert the incident power density to constant power output, each horn over a predetermined frequency range. Thus in the exemplary measurement system one probe horn is constructed to efficiently and properly operate from 750 to 4000 megacycles, with a companion horn probe overlapping at 3750 to 10,000 megacycles. These two horn units are used to effectively measure from 0.75 to 10 kmc., without the use of dissipative attenuators or other elements that result in heating or wasted power within the apparatus. For practical field measurements below 750 megacycles the tunable resonant probe of the copending application is utilized. With the same terminal indicating bridge, the latter probe extends the field measurement range down to the order 200 megacycles.

The horn assemblies of the exemplary system are conical in shape and adjusted to pick up at their below cut-off sections for the indicated frequencies to act as a filter reflecting power, providing a predetermined relationship of output energy to the incident energy. Lightweight relatively inexpensive portable probes result that remain cool and accurate under all operating conditions over the broad microwave band set forth. The exemplary probes further are constructed to have an unbalanced line output of predetermined impedance, such as 50 ohms. This affords an arrangement useful for connection of the probe directly to the power bridge meter.

The power density probe of this invention utilizes a horn that is proportioned with regions that are below cut-off over the frequency range of its measurement operation. We have determined that by positioning the tip of a rod or other suitable energy pick-up element axially along the horn, that a calibrated power (incident to pick-up) relationship is feasible. Towards this end, we have found that for each frequency in the probe horn range there is a corresponding axial position of the pick-up element to deliver a predetermined output energy relation to incident power. In other words, by presetting the axial position of the pick-up element in the horn probe, in accordance with a scale calibrated thereon for frequency, it is directly ready for calibrated power density measurement.

A probe horn hereof is positioned at the location of the microwave field to be measured. Its adjustable central rod is axially positioned in accordance with the frequency scale on the probe. The horn probe is thereby preset, through its movable central rod, in accordance to the frequency to be probed. The result is a predetermined power level relationship at the output of the horn probe when it is immersed in a power density field at the preset frequency. This physical phenomena and relation will be explained in more detail hereinafter.

The exemplary probes, for example, may be designed to deliver one watt of energy into an unbalanced 50 ohm line when immersed in a one watt per square centimeter field. By connecting a conventional power bridge to the 50 ohm line, the meter scale reads directly in power density. An attenuator incorporated in the bridge meter circuit adapts the probe for use in power density measurements below its direct one watt per square centimeter value, as for example, in several scale steps down to 1 milliwatt mid-scale reading. The novel power density probe system of the present invention thus can be used for broad band measurements, directly in milliwatts per square centimeter to watts per square centimeter, with simple rugged portable equipment.

The units of the invention system are effectively shielded to make them insensitive to stray radio frequency fields. Also, they readily withstand large power overloads due to the wide power handling capacity. The simplicity of operation and portability of the system makes it very easy to use. There is no heating up of the equipment due to high power density immersion or measurement. Further, there is no likelihood of burning out sensitive elements of the power meter with the invention probe.

It is accordingly an object of the present invention to provide a novel microwave power density probe and measuring system.

Another object of the present invention is to provide a novel near field frequency probe incorporating an adjustable horn assembly.

A further object of the present invention is to provide a novel portable relatively inexpensive microwave power density measuring system that withstands large power overloads, and does not appreciably heat up during its immersion in intense microwave fields.

Still another object of the present invention is to provide a microwave power density probe utilizing novel horn assemblies settable for frequencies over a wide range, delivering a signal output at the probe output terminals in magnitude calibrated to correspond with that impressed into the horn proper.

Still a further object of the present invention is to provide novel microwave power density probes that are respectively accurately calibrated over a wide frequency range, e.g. 750 to 4000, and 3750 to 10,000 megacycles, whereby the power output of the probes corresponds to the power density input over their respective frequency ranges.

These and further objects of the present invention will become more apparent in the following description of the exemplary embodiment, illustrated in the drawings, in which:

FIG. 1 illustrates one form which the horn probe and indicator system may assume in practice. The probe horn 15 is conical in shape and of conductive material such as brass or aluminum. A composition handle 16 has a conical section 17 in which the neck of horn 15 is supported. The horn is shaped and proportioned for the frequency range for which it is to serve as a calibrated probe, as will be detailed hereinafter. Normally a cone or horn is used to provide transmission of microwave signals, generally with gain. However, the configuration of horn 15 and its length is to actually materially attenuate the microwave signals in its operating frequency range, at particular regions thereof in accordance with frequency, as will be set forth hereinafter.

A transversely movable probe assembly 20 is centrally supported within a guide section 21 interior of handle 16. The tip 22 of a coaxial rod extends from probe assembly 20 into the horn 15. The rod 23 (see FIG. 5) extending from tip 22 forms a coaxial transmission unit for microwave signals picked-up by probe tip 22 within horn 15, as will be described. The cylindrical metal tube 24 forming the housing for the probe assembly 20 is the grounded element of the said coaxial unit. A scale 25 is marked or etched on tube 24, calibrated for presetting the position of probe tip 22 axially in horn 15. A lock nut 26 is used to grip the probe assembly 20 in its adjusted position.

With probe tip 22 axially preset in horn 15 in accordance with the frequency of the microwaves to be measured for power density, a calibrated signal output relationship thereupon exists to incident power density. The horn probe signal output appears at the coaxial connector 27 at the end of the probe assembly 20. A coaxial cable 30 connects to connector 27 through its end coaxial connector 28, and conducts the output energy of the probe horn to the bridge meter 35. An end connector 31 effects the electrical juncture of cable 30 and the meter 35 input. Coaxial cable 30 may be of any suitable length to provide ample distance between the horn probe at the microwave power density site, for the operation of meter 35 remote therefrom.

In the exemplary meter 35 the power output energy of the horn probe is initially impressed, through coaxial cable 30, to an attenuator 36 that is set for the appropriate power level. The resultant power is measured in unit 35 by a thermistor element that is incorporated in a temperature compensated direct current bridge. The power detected by the thermistor changes the operating condition of the bridge, directly showing the power density on indicating meter 37. Details of the power bridge 35 circuit elements are not shown as they are in themselves well known in the art, and the invention system and probe are not limited to any particular metering device.

The meter 35, for example, may have an unbalanced 50 ohm line input at connector 31 that is suitably matched with a corresponding output impedance at connector 27 of probe assembly 20. The bridge meter 35 preferably incorporates a self-calibrating arrangement to check the zero balance and sensitivity of the bridge at all times. Towards this end a "zero set" control 38 and "sensitivity" control 39 are used. The exemplary indicating meter 37 is directly calibrated in watts per square centimeter, corresponding to its calibration with attenuator 36 set at the X 1.0.

The power density readings of indicating meter 37 are direct, and accurately measure the power density incident in the horn 15. It is preferable to put the "1.0" reading, its nominal rating, center of the meter, with the range 1 to 2 also being readable. It is of course feasible to construct the probe horn and bridge meter 35 for higher or lower nominal power readings, within the principles of the invention hereof. The attenuator 36 may be moved to a different power level, for example X 0.1. Such setting adjusts the signal relationships whereby the meter 37 readings are multiplied by 0.1 for the probed field density values. Similarly, attenuator setting for X 0.01 and X 0.001 are feasible, giving a one-thousand to one range in the instrument.

The exemplary probe and meter is accordingly directly usable with simple adjustment for absolute power measurements from 1 milliwatt to 1 watt per square centimeter (mid-scale). The frequency range of exemplary units are 750 to 4,000 and 3,750 to 10,000 megacycles for the reasonably sized portable dimensions thereof to be set forth. As stated, the probe assembly 20 with its pickup tip 22 is preadjusted to an axial position within the horn (15) corresponding to the frequency of the field to be measured. It is of course feasible to construct the horn probes hereof to measure frequencies below 750 megacycles as well as above 10,000 megacycles, if desired.

A practical horn probe unit for the microwave range has range of 750 to 4,000 megacycles, with a reasonable scale (25) and calibration settings. It is noted that the lower limit of 750 megacycles is selected for such exemplary horn unit on the basis of portability and bulk, and also because the lower frequencies, namely those extending below 750 megacycles, an alternate form of probe has been found suitable, effective, compact and efficient. Such latter probe system forms the basis of our copending patent application referred to above. The latter lower frequency probe is based on a below cut-off wave-guide principles, and is constructed for direct use with the common calibrated bridge meter (35).

We have found that reasonably sized portable horn probes hereof, to be effective from the order of 700 megacycles on up to 10,000 megacycles in range, preferably in two physical steps. As stated, one conical probe has been found to be practical from 0.75 kmc. to 4.0 kmc.; with a further one readily covering the band 3.75 kmc. to 10 kmc. Thus, with three light-weight relatively inexpensive portable probes, namely the two of the horn type, and the one of the wave-guide construction, we can accurately probe the broad band of 0.2 kmc. to 10 kmc. with a single power density meter 35. These three probe units and the meter are all portable and usable in the laboratory as well as out in the field, and provide direct calibrated readings of the power density of the site probed.

FIG. 2 shows in cross-section the exemplary horn probe. The metallic conical horn 15 has its neck portion mounted in the conical extension 17 of handle 16. The inner edge of the cone 15 is preferably welded to the mating undercut edge 40 of guide section 21. The guide section 21 and horn 15 are thus at a common electrical potential, preferably at system ground when in circuit with the meter 35 (FIG. 1).

The axially adjustable longitudinal probe assembly 20 has a metallic outer tube 24 that is maintained in electrical and physical connection with the guide section 21, as will be set forth. Further, the tube 24 is in direct electrical connection with outer terminal 28 of connector 27, which is generally at signal ground. Probe 20 is coupled to guide section 21 by a spiral spring contact 41. Spring 41 presses between tube 24 and the interior of grooved portion 42 of metallic guide section 21.

Spring 41 thus maintains good electrical connection with the tube 24 of probe assembly 20 near the neck of horn 15. FIG. 4 illustrates such arrangement, in cross-section. A bearing 43 preferably of Teflon material is positioned close to the neck of cone 15, in groove portion 42 of the guide section 21. The horn end of the probe member 20 is thus kept in accurate coaxial alignment with the axis of horn 15. FIG. 3 shows this arrangement in cross-section.

The probe member 20 also is secured firmly, when adjusted longitudinally, with the lock-nut 26 operating on the slotted end 45 of guide section 21. This serves to hold probe tube 24 and in-horn projecting central conductor 22 in the requisite axial path. Nut 26 engages a threaded portion at the slotted end 45 to firmly grip the guide end onto tube 24 of probe member 20, when preset. This is as described for the corresponding probe element in the aforesaid copending case. FIG. 6 is an enlarged elevational view of the guide end 45 and probe member 20 therewith. The calibration scale, in thirty-seconds of an inch graduations, is moved opposite the edge 46 of guide section 21 as index, and then locked in position by lock-nut 26.

The exemplary probe member 20 is illustrated enlarged and in partial cross-section in FIG. 5. The axial length of the probe 20 is determined by the effective probing region in horn 15, and of handle 16. The factors of probing and axial probe regions will be described in detail hereinafter. The axial extent of the probing corresponds in a particular unit to the effective horn probe region for the frequency range of design. The length of scale 25 spans such axial probing region, to correspondingly determine the calibrated positioning of the probe pick-up (antenna) 22 within the horn 15.

Probe member 20 embodies a concentric Teflon, or equivalent low-loss dielectric cylinder between central rod 23 and the tube 24. The proportioning of the rod and tube 24 diameters corresponds to the characteristic impedance desired to match the cable 30 and meter 35 input. A practical impedance used is 50 ohms.

Tube 24 joins with the body 47 of connector 27, which is of smaller diameter. A matched transition is effected by providing a space 48 of .030 inch between the edge 49 of Teflon cylinder 29 and a metal nut 50. The Teflon core of connector 47 is exposed at end 51 and reduced in diameter as shown in FIG. 5. The inner conductor of connector 27 (not shown) is electrically joined with rod 23. The nut 50 is carefully soldered in between tube 24 and body 47.

FIG. 7 is a cross-sectional view showing the central mounting of probe member 20 with respect to guide section 21, with a space 52 therebetween. As described hereinabove, the probe member is held in precise axial arrangement within guide section 21 and with respect to the axis of horn 15 coaxial therewith. Also, the probe member is firmly secured in position once precisely positioned axially, by lock nut 26 and guide end 45, and with central bearing 43. The contact spring 41 and guide end 45 keep the electrical connection intact between guide section 21 and tube 24 of probe member 20.

The horn 15 is conical and therefore symmetrical about its axis. Horn 15 is proportioned to have below cut-off regions to cover the frequency range of probe operation of the particular horn selected. Horns used as radiators or receivers are known and used as imparting gain to the traversing waves. In the invention system however, by using the horn (15) in its below cut-off region, we advantageously have relatively low signal strengths and low power dissipation in the system. The exemplary probe operates in the order of up to a few watts of power, rather than hundreds or thousands of watts of prior art systems.

The substantial attenuation of the incident power to the horn (15) in its operating frequency range results in no heat dissipative problems, as well as relatively light-weight, portable and less expensive apparatus. Also, the resultant accuracy of power density measurement with the invention system is improved over the more complex prior methods. A particular horn (15) configuration is precisely calibrated in the below cut-off frequency range used with it, with respect to the axial position of the probe tip 22 for each frequency thereof.

The exemplary probe tip 22 is a brass rod, silver plated, one-eight inches in diameter. In the higher frequency unit, per FIG. 10 to be described, tip 22 projected one-quarter inch from the body of probe member 20; in the lower frequency range unit, per FIG. 9, one-half inch. Other dimensions therefor are of course feasible. The probe tip 22 serves as an antenna pick-up along a precise path within the horn (15) namely along its axis. Further the pick-up tip 22 is located at precise axial locations on the horn axis for the calibration and resetting purposes.

FIG. 8 graphically illustrates the practical effects in axial pickup by the probe tip (22) within a linear cone horn (15) in the below cut-off frequency mode. The horn axis 55 locates the probe tip (22) locus. The respective points $a, b, c \ldots$ along axis 55 correspond to the equal power density points for discrete frequencies. The noted frequencies are 1 kmc., 2 kmc., 3 kmc. . . . 10 kmc. along the axis 55 in the direction from the horn entrance towards its throat. This graphical representation indicates the physical factors and effects in the horn operation in accordance with the invention system. The dotted vertical lines intersecting the equal power density points $a, b, c$ etc. represents the location within the cone (15) at which frequency cut-off occurs. The corresponding cut-off frequencies therefor are noted, wherein position $a$ is for 1 kmc.; $b$, for 2 kmc.; $c$ for 3 kmc. etc.

In other words the cut-off frequency points $a, b, c$, etc. correspond to the equal power density points for the corresponding frequencies first cut-off at the axial locations. While integral frequencies are indicated, it is continuous phenomenon frequencywise, with each discrete frequency in the range of cone cut-off being represented long the axial path 55 of the cone. In this way we can directly calibrate the coaxial assembly scale (25). The tip (22) of the probe is always behind (to the right in FIGS. 1, 2 and 8) of the points ($a, b, c$, etc.) at which cut-off occurs, with the scale (25) integrating the final positions for the frequency range.

The gain of a horn varies inversely with wavelength. Therefore the horn is preferably constructed for optimum proportions at the high frequency end of the operating range. Also, a smaller cone angle ($\phi$) results in greater length of travel for the probe tip (22) over the operating range. In any event, the scale (25) for the probe tip (22) locations within a given horn configuration is arranged for the discrete frequencies in the range to produce a given output signal value for a given incident field intensity per unit area.

In practice we can readily cover the 0.75 kmc. to 10 kmc. range with two conical horn probes corresponding in shape and construction as shown and described in connection with FIGS. 1 to 7 hereinabove. The lower frequency range unit is for 0.75 kmc. to 4 kmc.; the higher range unit somewhat overlapping at 3.75 kmc. to 10 kmc.

For frequencies below 0.75 kmc. the horn unit becomes rather large and bulky for portability, and we utilize the probe system of our copending case referred to for the range 0.2 kmc. to 0.8 kmc.

FIG. 9 shows a typical calibration curve 60 for the lower frequency range cone unit, namely covering 0.75 kmc. to 4.0 kmc. A precise, reproduceable calibration relation is effected. One simply derives the "scale reading" for a desired frequency to be probed from curve 60 (or equivalent numerical chart). Thus, for 0.75 kmc. the scale 25 is set at 0.25 inch with respect to guide index edge 46 (FIG. 6), and locked in position by locknut 26. For this lowest frequency in the range the probe tip 22 is furtherest into cone 15, namely corresponding to the left of point $a$ in FIG. 8. For the highest frequency in this unit per FIG. 9, namely 40 kmc. the scale 25 is set at 4.5 inches. This moves probe member 20 to the right in FIGS. 1 and 2, with probe tip 22 nearest to the throat of cone horn 15. This corresponds to point *d* in FIG. 8. In this model a 4.25 inch movement of tip 22 along its axis provides the range 0.75 to 4.0 kmc., with the intermediate frequencies preset according to curve 60.

At the preset position of probe tip 22 per scale 25 and curve 60, a one watt per square centimeter field strength with horn 15 located in the field, at the corresponding frequency, will cause a 1.0 watt reading (center of scale) in meter 35, with attenuator 36 set at X 1. Correspondingly, other field strengths probed will accurately register on indicator 37. Should the field intensity be of the order of 0.01 watt per square centimeter, then power level attenuator 36 is set at X 0.01 and the indicator 37 will read accordingly. Other power levels will be accurately read and directly indicated by indicator 37, with the appropriate attenuator (36) setting.

The horn unit (15) is left at the site of the power density measurements, and the operator is either properly shielded or moved to a remote safe point with meter 35 interconnected by cable 30. The dot-and-dash curve 61 of FIG. 9 is one for the horn 15 itself, without losses in the associated coaxial cable 30 interconnecting the probe tip 22 and meter 35. Cable 30 is therefore preferably of a fixed length and type, and is calibrated together with the cone probe (15) to produce the resultant calibration curve 60.

FIG 10 shows the curves for the higher range probe unit, namely for 3.75 to 10 kmc. Wavy curve 65 is the actual calibration curve; curve 66 being the corresponding theoretically smooth one. The wavy actual curve results from minor internal reflections such as due to connectors and transition points. The wavy shape is simply integrated in the scale (25) readings. The higher curve 67 is that with no remote cable (30) losses, as is associated curve 62 of FIG. 9. The scale readings (per 25) for the range 3.75 to 10 kmc. are about 0.28 inch to 1.62 inches by curve 65, a spread of 1.34 inches. Thus the probe tip (22) for this higher range horn (15) has a relatively shorter travel for a 6.25 kmc. range, than the lower range horn per FIG. 9. The higher range horn is a smaller unit, as well.

It is noted that the higher frequency end of both curves 60 and 65 level off asymptotically. This factor determines a practical cut-off for the range of a horn assembly. By suitable horn configuration such asymmetry can be minimized or obviated. FIG. 11 illustrates an exponentially shaped horn, preferably symmetrical about its axis of revolution. The configuration of horn 70 results in a more linear calibration curve; curve 75 being the actual, and dotted curve 76 the theoretical one, without cable losses. Other shapes of calibration curves can be obtained by changing the basic shape and or type of the horn, per se.

The horn 70 is coupled to a handle 71 and axial probe member 72 with a pickup tip 73 in the manner of FIGS. 1 to 7. The output signal for meter (35) is transmitted at output coaxial terminal 74. The frequency range of horn 70 is dependent upon its axial size, aperture size, and axial positioning of probe tip 73, as will now be understood by those skilled in the art. The operation of the horn probe (70) is identical to that described hereinabove for the conical horn 15. Also pyramidal, sectoral and other desired horn shapes or feed-ins may be used instead, for particularly desired characteristics.

In the exemplary horn probes, corresponding to conical horn 15 of FIGS. 1 to 7: For the higher frequency range of 3.75 to 10 kmc. the horn per se was fabricated of .020" brass material from a circular form of 8" radius. A central hole 1.66" in radius was made. With suitable trimming the conical shape was rolled up, with a ¼" butt joint, an input aperture 6" across; and a throat aperture of 9/16". The basic tubular probe member (20) was 6" long with the probe tip projecting ¼", and the outer tubular diameter being 0.55". The overall assembled horn probe for this higher range was 11.5" long, and weighed one pound.

For the lower frequency range of .75 to 4.0 kmc., the conical horn per se was substantially bigger. For this horn .020" aluminum may be used to save weight, however, brass affords more rigidity and ruggedness in field use. The developed circular form was 13.87 in radius, but only 182° of this form was needed. The cone was rolled up and butt joined along a ¼" seam. Its input aperture was made 14" in diameter. A central opening was cut and the horn joined to the probe proper. The tubular probe member (20) was 0.55" in diameter, and 9" long. The probe tip (22) extended 0.5" from the tube. This horn probe had an overall length of 16.5" and weighed 3 pounds.

The exemplary frequency range, the dimensions, and described arrangements are made for illustrative purposes. Changes may be made that are within the spirit and scope of our invention. For more refined accuracy of measurement a micrometer-type of adjustment unit attached to guide 21 and unit 20 may be used at scale 25, in the manner of micrometer calipers. For most applications in the field, the illustrated scale and lock nut means have been found practical. However, the said micrometer arrangement could be useful for precise laboratory purposes.

The system components are properly shielded, to make them insensitive to stray radio frequency fields. Also, due to selective frequency action, stray fields are substantially attenuated before affecting the instrument readings. Substantially large overloads will not destroy component elements of the invention system; and when properly used with attenuator 36 can withstand all practical field power densities that may be encountered. The units and system hereof are very simple to operate, readily learned to use, and directly calibrated for accurate reading in the field.

Although the present invention has been described in connection with exemplary embodiments thereof, modifications and variations thereof are feasible within the broader spirit and scope of the invention, as set forth in the following claims.

We claim:

1. Apparatus for the measurement of the field intensity of a broadband of radiant energy comprising a hollow receptor open-ended for receiving fields from regions of space selected for measurement and proportioned to have below cut-off characteristics over the band, signal pick-up means adjustably positionable across the interior of said receptor and being receptive of radiant energy incident in the receptor, and a calibration scale associated with the pick-up means for determining the locations thereof in the receptor that establish a predetermined relation over the band between the signal level transmitted by said pick-up means with respect to the field intensity of the radiant energy incident in the receptor.

2. A probe for the measurement of the field intensity of a broadband of radiant energy comprising a horn open-ended for receiving fields from regions of space selected for measurement and proportioned to have below cut-off characteristics over the band, a signal pick-up element movable across the interior of said horn and including a portion extending through the horn apex, said element being receptive to radiant energy incident in the horn, means for fastening said element in position with respect to said horn, and a calibration scale associated with said element for determining the below cut-off reception positions of the element in the horn that establish a proportional relation over the band between the signal level transmitted by said element to the probe output with respect to the field intensity of the radiant energy incident in the horn.

3. A broadband power density probe for the measurement of the field intensity of microwaves over a predetermined frequency range comprising a hollow receptor open-ended for receiving fields from regions of space selected for measurement and proportioned to have below cut-off characteristics over said frequency range, signal pick-up means adjustably positionable in said receptor and being receptive to microwaves incident in the receptor, a coaxial line assembly connected with said pick-up means and proportioned to a predetermined characteristic impedance, and a calibration scale on said assembly for determining the locations of the pick-up means in the receptor that establish a linear relation over the frequency range between the signal level transmitted by said assembly to the probe output with respect to the field intensity of the microwaves incident in the receptor, said pick-up means being thereby located in below cut-off reception positions within the receptor for the frequencies probed.

4. A probe for the broadband measurement of microwaves of the character described comprising a hollow receptor of generally conical shape open-ended for receiving fields from regions of space selected for measurement and proportioned to have below cut-off characteristics over a predetermined frequency range, a signal pick-up element movable across the interior of said receptor along the axial path thereof and extending through the receptor apex, the interior tip of the element being receptive to microwaves incident in the receptor, and means for fastening said element in position in said receptor for determining the locations thereof in the receptor that establish a proportional relation over the frequency range between the signal level transmitted by said element to the probe output with respect to the field intensity of microwaves in the receptor, the element tip being located in below cut-off reception positions along the receptor axis for the frequencies probed.

5. A broadband microwave power density probe of the character described for the measurement of the field intensity of a broadband of microwaves over a predetermined frequency range comprising a horn of conical shape open-ended for receiving fields from regions of space selected for measurement and proportioned to have below cut-off characteristics over said frequency range, a signal pick-up rod adjustably positionable across the interior of said horn along the axial path thereof with the interiorly extending tip of the rod being receptive to microwaves incident in the horn, a coaxial line assembly connected with said rod incorporating a metallic outer tube proportioned to a predetermined characteristic impedance, means for locking said assembly in position with respect to said horn, and a calibration scale on said assembly for determining the locations of the rod tip in the horn that establish a linear relation over the frequency range between the signal level transmitted by said assembly to the probe output with respect to the field intensity of the microwaves incident in the horn.

6. A probe for the measurement of the field intensity of a broad band of microwaves of the character described comprising a hollow receptor of generally conical shape open-ended for receiving fields from regions of space selected for measurement and proportioned to have below cut-off characteristics over a predetermined frequency range, a rod movable across the interior of said receptor along the axial path thereof with the interiorly extending tip of the rod being receptive to microwaves incident in the receptor, a coaxial line assembly connected with and carrying said rod, said assembly incorporating a metallic outer tube extending through the receptor apex and in electrical connection therewith, said assembly being proportioned with a predetermined characteristic impedance, means for fastening said assembly in position with respect to said receptor, and a calibration scale on said assembly for determining the locations of the rod tip in the receptor that establish a predetermined relation over the frequency range between the signal level transmitted by said assembly to the probe output with respect to the field intensity of the microwaves incident in the receptor, the rod tip being located in below cut-off reception positions within the receptor for the frequencies probed.

7. A probe as claimed in claim 2, in which the horn has an exponentially conical configuration.

8. A broadband power density probe as claimed in claim 3, in which the horn has an exponentially conical configuration for linearalizing the calibration scale.

9. A probe as claimed in claim 2, further including a metallic sleeve extending outwardly from the horn apex in electrical connection with the horn and surrounding said element.

10. A probe as claimed in claim 4, further including a metallic sleeve extending from the receptor apex in electrical connection therewith and surrounding said element, the exterior end of said sleeve being slotted to co-act with a locknut to constitute said fastening means.

11. A broadband microwave power density probe as claimed in claim 5, further including a metallic sleeve extending axially outwardly from the horn apex in electrical connection therewith and surrounding said assembly, and contact means between said sleeve and the assembly outer tube.

12. A probe as claimed in claim 9, further including an insulation handle about said sleeve and the horn apex.

References Cited in the file of this patent

UNITED STATES PATENTS

| | | |
|---|---|---|
| 2,204,179 | George | June 11, 1940 |
| 2,283,935 | King | May 26, 1942 |
| 2,497,094 | Moreno | Feb. 14, 1950 |
| 2,933,684 | Selby et al. | Apr. 19, 1960 |